United States Patent
Hayashi et al.

(10) Patent No.: US 8,422,440 B2
(45) Date of Patent: Apr. 16, 2013

(54) RADIO BASE STATION AND MOBILE COMMUNICATION METHOD

(75) Inventors: Takahiro Hayashi, Yokosuka (JP);
Akihito Hanaki, Yokohama (JP);
Yoshikazu Goto, Yokohama (JP);
Yukiko Takagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 760 days.

(21) Appl. No.: 12/430,363

(22) Filed: Apr. 27, 2009

(65) Prior Publication Data

US 2009/0274108 A1    Nov. 5, 2009

(30) Foreign Application Priority Data

May 1, 2008   (JP) ................. P2008-119861

(51) Int. Cl.
*H04W 4/00* (2009.01)
(52) U.S. Cl.
USPC ........... 370/329; 370/335; 370/338; 455/461; 455/3.05; 455/560
(58) Field of Classification Search .................. 370/235, 370/280, 329, 335, 395.12; 455/450, 452.2
See application file for complete search history.

(56) References Cited

U.S. PATENT DOCUMENTS

| | | | |
|---|---|---|---|
| 2002/0191559 A1* | 12/2002 | Chen et al. | 370/329 |
| 2006/0126509 A1 | 6/2006 | Abi-Nassif et al. | |
| 2007/0110004 A1* | 5/2007 | Liu et al. | 370/335 |
| 2008/0146243 A1* | 6/2008 | Usuda et al. | 455/452.2 |
| 2009/0059790 A1* | 3/2009 | Calvert et al. | 370/235 |

FOREIGN PATENT DOCUMENTS

| | | | |
|---|---|---|---|
| EP | 1331768 A1 | | 10/2002 |
| EP | 1672845 A1 | * | 6/2006 |
| JP | 2005-057323 A | | 3/2005 |
| JP | 2005-286786 A | | 10/2005 |
| JP | 2007-259031 A | | 10/2007 |

OTHER PUBLICATIONS

Szilveszter et al. "Providing Congestion Control in the Iub Transport Network for HSDPA"; Global Telecommunications Conference, 2007. GLOBECOM '07. IEEE, IEEE, Piscateway, NJ, USA, Nov. 2007, pp. 5293-5297.
ETSI TR 125 902 V7.1.0. (Mar. 2007); "Universal Mobile Telecommunications System (UMTS); IUB/IUR Congestion Control (3GPP TR 25.902 Version 7.1.0 Release 7)"; France, Mar. 2007, pp. 1-15.

* cited by examiner

*Primary Examiner* — Andrew Lai
*Assistant Examiner* — Jamaal Henson
(74) *Attorney, Agent, or Firm* — Marvin A. Motsenbocker; Mots Law, PLLC

(57) ABSTRACT

A radio base station according to the present invention includes: a determiner determining a transfer rate of data transferred from the radio network controller to the radio base station, based on a predetermined bandwidth of a wired transmission path, a bandwidth of the wired transmission path not being used, and a bandwidth of the wired transmission path being used by the mobile station; and a notifier notifying the radio network controller of the determined transfer rate.

4 Claims, 4 Drawing Sheets

RADIO BASE STATION AND MOBILE COMMUNICATION METHOD

CROSS REFERENCE TO RELATED APPLICATIONS

This application is based upon and claims the benefit of priority from prior Japanese Patent Application No. 2008-119861, filed on May 1, 2008; the entire contents of which are incorporated herein by reference.

BACKGROUND OF THE INVENTION

1. Field of the Invention

The present invention relates to a radio base station configured to receive data transferred from a radio network controller through a wired transmission path having a predetermined bandwidth, and to transmit the data to a mobile station through a radio transmission path. The present invention also relates to a mobile communication method.

2. Description of the Related Art

There is conventionally known a mobile communication system using flow control in a wired transmission path (Iub interface) established between a radio network controller RNC and a radio base station BTS (see, for example, Japanese Patent Publication No. 2005-286786 (which is referred to as Patent Document 1 below)).

Specifically, as shown in FIG. 1, a mobile communication system described in Patent Document 1 is configured such that the radio base station BTS determines a transfer rate of data transferred from the radio network controller RNC to the radio base station BTS, based on a "bandwidth usage percentage (='bandwidth being used'/'a predetermined bandwidth')" in the wired transmission path.

In the mobile communication system described in Patent Document 1, the "bandwidth usage percentage" increases as a bandwidth being used by a certain mobile station UE increases. Accordingly, this mobile communication system has a problem of lowering the transfer rate at which the radio network controller RNC transfers data directed to the certain mobile station UE to the radio base station BTS even when there is space in, for example, the radio transmission path established between the radio base station BTS and the certain mobile station UE, or a buffer for the certain mobile station UE in the radio base station BTS.

SUMMARY OF THE INVENTION

A first aspect of the present invention is summarized as a radio base station configured to receive data transferred from a radio network controller through a wired transmission path having a predetermined bandwidth, and to transmit the data to a mobile station through a radio transmission path. The radio base station includes: a determiner configured to determine a transfer rate at which the radio network controller transfers the data to the radio base station, based on the predetermined bandwidth, on a bandwidth of the wired transmission path not being used, and on a bandwidth of the wired transmission path being used by the mobile station; and a notifier configured to notify the radio network controller of a determined transfer rate.

In the first aspect of the present invention, the determiner may be configured to determine the transfer rate, further based on at least one of a communication quality of the radio transmission path, a data discard state in the wired transmission path, a capability of the mobile station and a contract type of the mobile station.

In the first aspect of the present invention, the wired transmission path is configured with a VP or VC in ATM, and the determiner may be configured to determine the transfer rate in further consideration of a ratio of a length of a header in an ATM cell to a length of a header in RLC-PDU.

In the first aspect of the present invention, the wired transmission path is configured with an IP transmission path, and the determiner may be configured to determine the transfer rate in further consideration of a ratio of a length of a header in an IP packet cell to a length of a header in RLC-PDU.

A second aspect of the present invention is summarized as a radio communication method by which a radio base station receives data transferred from a radio network controller though a wired transmission path having a predetermined bandwidth, and transmits the data to a mobile station through a radio transmission path. The method includes the steps of: (a) determining, at the radio base station, a transfer rate at which the radio network controller transfers the data to the radio base station, based on the predetermined bandwidth, on a bandwidth of the wired transmission path not being used, and on a bandwidth of the wired transmission path being used by the mobile station; (b) notifying a determined transfer rate from the radio base station to the radio network controller; and (c) transferring data from the radio network controller to the radio base station through the wired transmission path at a notified transfer rate.

DESCRIPTION OF THE PREFERRED EMBODIMENT (Configuration of Mobile Communication System According to First Embodiment of Present Invention)

With reference to FIGS. 2 to 5, a description will be given of the configuration of a mobile communication system according to a first embodiment of the present invention.

Figure 1:
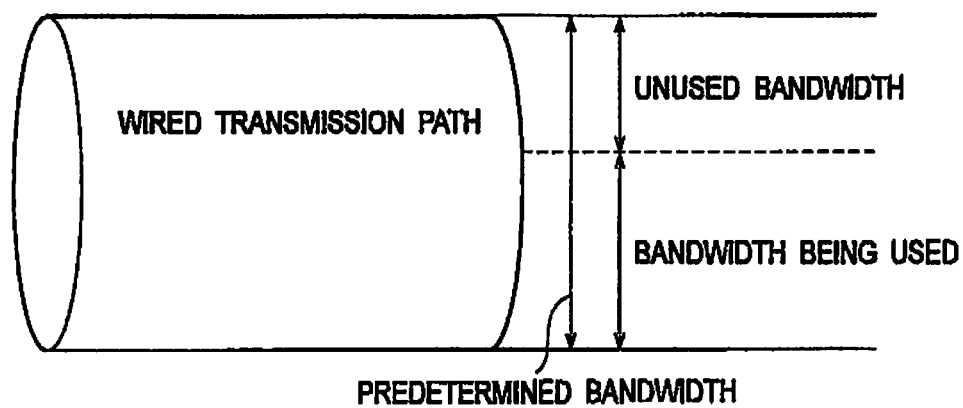
FIG. 1 is a diagram illustrating a problem of a conventional mobile communication system.
Figure 2:
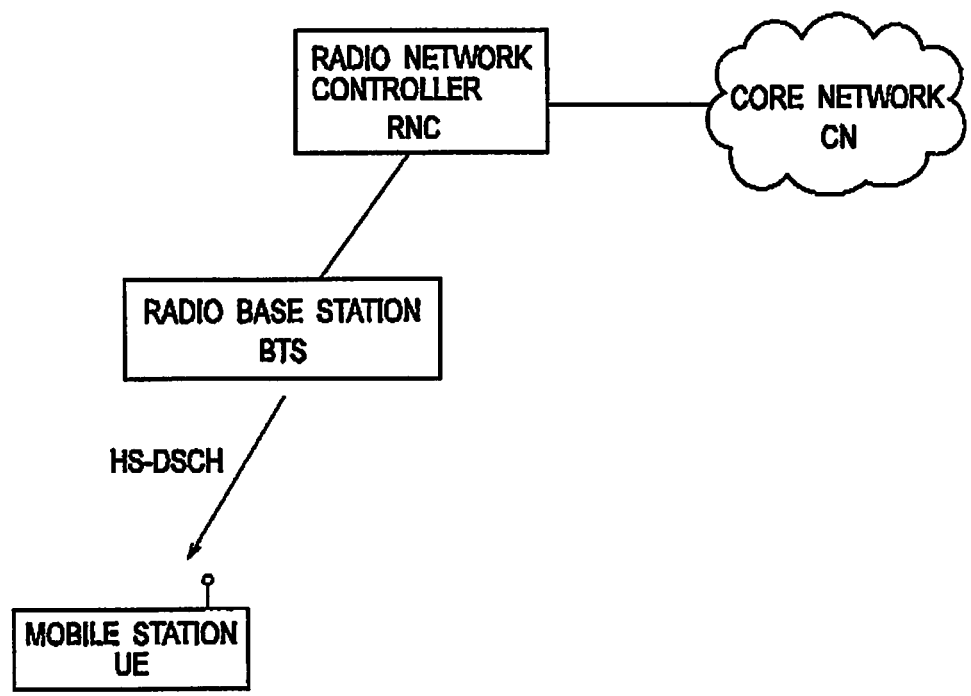
FIG. 2 is a diagram showing an overall configuration of a mobile communication system according to a first embodiment of the present invention.

As shown in FIG. 2, the mobile communication system according to the present embodiment includes a core network CN, a radio network controller RNC, and a radio base station BTS.

The mobile communication system according to the present embodiment employs a High Speed Downlink Packet Access (HSDPA) scheme. In the HSDPA scheme, Adaptive Modulation and Coding, Hybrid Automatic Repeat reqQuest (H-ARQ), and the like are employed.

The mobile communication system according to the present embodiment is configured such that the radio base station BTS receives data transferred from the radio network controller RNC through a wired transmission path having a predetermined bandwidth, and transmits the data to a mobile station UE through a High-Speed Downlink Shared CHannel (HS-DSCH).

In the mobile communication system according to the present embodiment, an ATM transmission path (a Virtual Path (VP) or a Virtual Connection (VC) in ATM) or an IP transmission path can be used as the wired transmission path.

Figure 3:
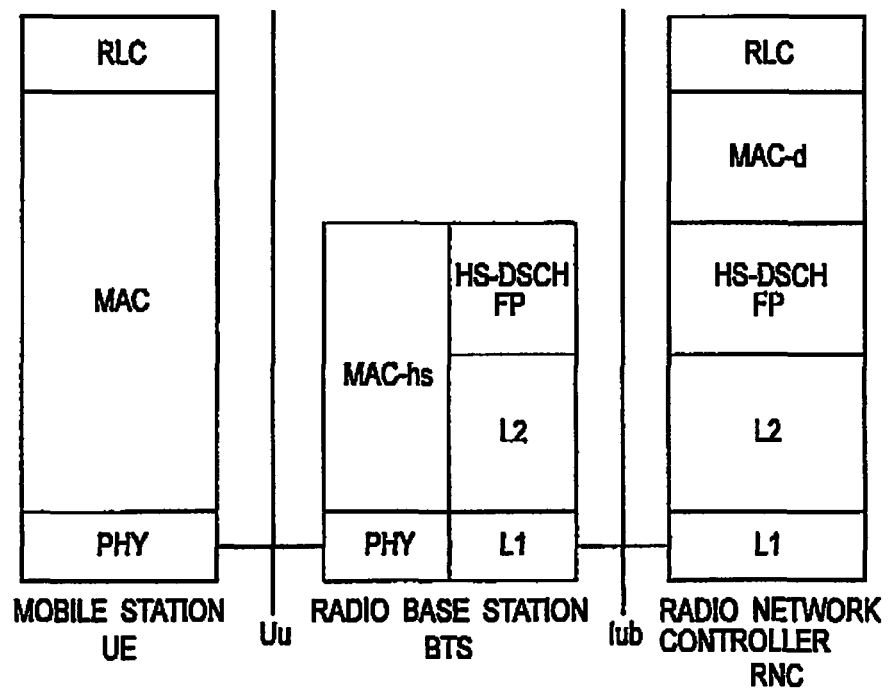
FIG. 3 is a diagram showing a protocol stack in the mobile communication system according to the first embodiment of die present invention.

FIG. 3 shows a user-plane protocol stack employed in the mobile communication system according to the present embodiment.

As shown in FIG. 3, the mobile station UE includes a physical layer PHY, a MAC layer, and an RLC layer, and is connected to the radio base station BTS through a Uu interface.

The radio network controller RNC includes an L1 layer, an L2 layer, an HS-DSCH FP layer, a MAC-d layer, and an RLC layer, and is connected to the radio base station BTS through an Iub interface.

The radio base station BTS includes a physical layer PHY and a MAC-hs layer which face the mobile station UE, and an L1 layer, an L2 layer, an HS-DSCH FP layer which face the radio network controller RNC.

In the present embodiment, the flow control is performed on data transferred from the radio network controller RNC to the radio base station BTS in the HS-DSCH FP layers through the Iub interface.

This flow control can optimally control the rate of RLC-PDU transmitted in the RLC layers.

Specifically, the radio network controller RNC is configured to transfer the data (RLC-PDU) to the radio base station BTS according to a transfer rate (a capacity allocation (CA) rate) notified of by the radio base station BTS.

Figure 4:
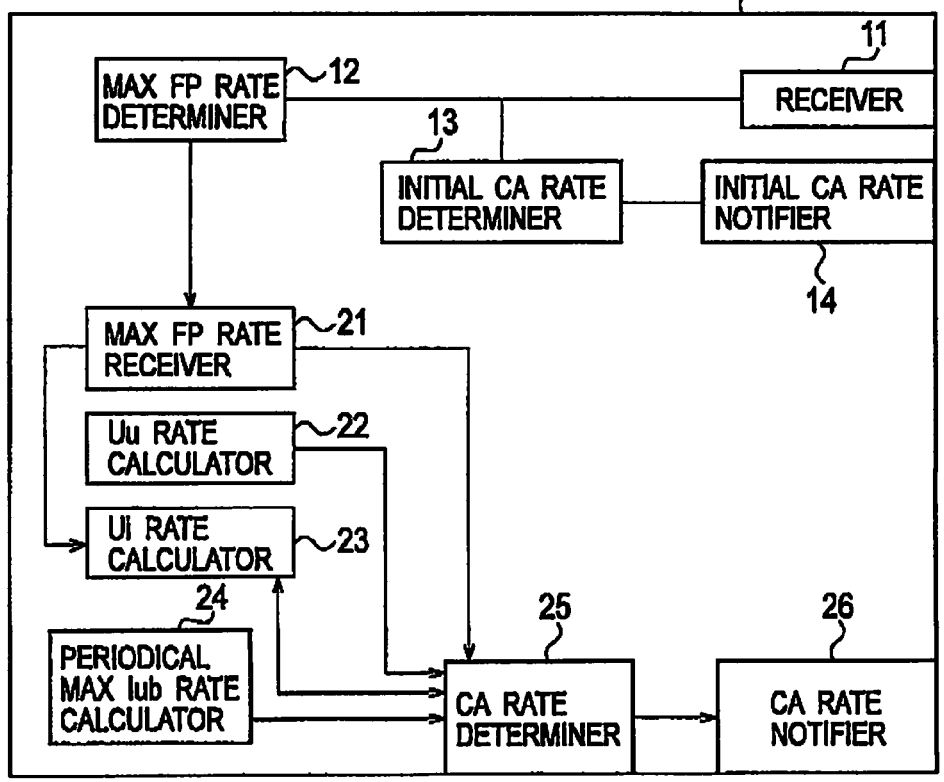
FIG. 4 is a diagram showing functional blocks of a radio base station according to the first embodiment of the present invention.

As shown in FIG. 4, the radio base station BTS according to the present embodiment includes a receiver 11, a MAX FP rate determiner 12, an initial CA rate determiner 13, an initial CA rate notifier 14, a MAX FP rate receiver 21, a Uu rate calculator 22, a Ui rate calculator 23, a periodical MAX Iub rate calculator 24, a CA rate determiner 25, and a CA rate notifier 26.

The receiver 11, the MAX FP rate determiner 12, the initial CA rate determiner 13, and the initial CA rate notifier 14 are functions for performing call control processing (AP level). Meanwhile, the MAX FP rate receiver 21, the Uu rate calculator 22, the Ui rate calculator 23, the periodical MAX Iub rate calculator 24, the CA rate determiner 25, and the CA rate notifier 26 are functions implemented in the HS-DSCH FP layer.

The receiver 11 is configured to receive a "MAX UE rate", a "MAX DL rate", a "MAX Iur rate" and the like notified of by the radio network controller RNC by means of an NBAP message.

The "MAX UE rate" is a maximum downlink transmission rate in a radio transmission path, which is defined based on the capability of the mobile station UE (UE capability).

The "MAX DL rate" is a maximum downlink transmission rate in the radio transmission path, which is defined based on the contract type or the like of the mobile station UE.

Note that it is so configured that the core network CN specifies the "MAX DL rate" by means of a "RAB Assignment Request" being a RANAP message.

When an Iur interface (which is an interface between the radio base station BTS and the radio network controller RNC) is configured with an ATM transmission path (a VP or a VC in ATM), the "MAX Iur rate" is a maximum downlink transmission rate which is limited according to the transmission bandwidth of the ATM transmission path.

The MAX FP rate determiner 12 is configured to determine a "MAX FP rate" based on the "MAX UE rate", the "MAX DL rate", and the "MAX Iur rate", and then notify the MAX FP rate receiver 21 of the determined "MAX FP rate".

Specifically, the MAX FP rate determiner 12 is configured to take a smallest value among the "MAX UE rate", the "MAX DL rate", and the "MAX Iur rate", and set the smallest value as the MAX FP rate.

The initial CA rate determiner 13 is configured to determine an initial CA rate based on the "MAX UE rate", the "MAX DL rate", the "MAX Iur rate", and a "MAX Iub rate", and then notify the initial CA rate notifier 14 of the determined initial CA rate.

When the Iub interface is configured with an ATM transmission path (a VP or a VC in ATM), the "MAX Iub rate" is a maximum downlink transmission rate which is limited according to the transmission bandwidth and usage percentage of the ATM transmission path.

The initial CA rate notifier 14 is configured to notify the radio network controller RNC of the initial CA rate determined by the initial CA rate determiner 13, by means of an NBAP message or the like.

The MAX FP rate receiver 21 is configured to notify the CA rate determiner 25 of the "MAX FP rate" notified of by the MAX FP rate determiner 12.

The Uu rate calculator 22 is configured to calculate a transmission rate (MAX Uu rate) at which data can be transmitted in the radio transmission path (Uu interface) between a certain mobile station UE and the radio base station BTS, based on a channel quality indicator (CQI) of that radio transmission path. The Uu rate calculator 22 is configured also to notify the CA rate determiner 25 of the calculated transmission rate.

As the MAX Uu rate, the Uu rate calculator 22 may alternatively be configured to calculate an average value of the MAX Uu rates obtained in a predetermined period.

Moreover, the Uu rate calculator 22 may alternatively be configured to calculate an average amount of data held in a buffer in the MAC-hs layer for each mobile station UE, then calculate a "Uu transmission tolerance coefficient" based on an "(average amount of data held in buffer in MAC-hs layer)/(MAX Uu rate)", and then notify the CA rate determiner 25 of a value obtained by multiplying the "MAX Uu rate" by the "Uu transmission tolerance coefficient."

The Ui rate calculator 23 is configured to calculate a transmission rate (MAX Ui rate) at which data can be transmitted in the wired transmission path between the radio base station BTS and the radio network controller RNC, according to a data discard state in the wired transmission path, and notify the CA rate determiner 25 of the calculated transmission rate.

Specifically, the Ui rate calculator 23 is configured to set the "MAX FP rate" as an initial value of the "MAX Ui rate", and increase or decrease the "MAX Ui rate" depending on whether or not data has been discarded in the wired transmission path within the predetermined period.

Figure 5:
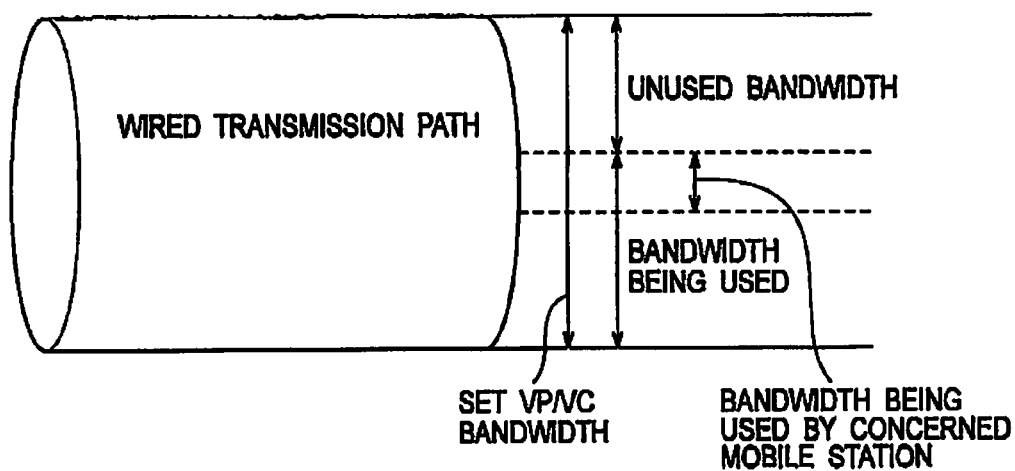
FIG. 5 is a diagram illustrating how the radio base station according to the first embodiment of the present invention determines a periodical MAX Iub rate.

When an ATM transmission path is used as the wired transmission path, the periodical MAX Iub rate calculator 24 is configured to calculate a "periodical MAX Iub rate" based on the following motors and notify the CA rate determiner 25 of the calculated "periodical MAX Iub rate". Specifically, as shown in FIG. 5, the "periodical MAX Iub rate" is calculated based on a VP/VC bandwidth set for the ATM transmission path (a predetermined bandwidth, a set VP/VC bandwidth), on a bandwidth of the wired transmission path not being used (unused bandwidth), and on a bandwidth of the wired transmission path being used by the mobile station UE.

For example, the periodical MAX Iub rate calculator 24 is configured to calculate the "periodical MAX Iub rate" by using the following equation.

> MAX {"set VP/VC bandwidth"×"ATM/RLC-PDU rate conversion coefficient"×(100−"bandwidth usage percentage (%)"−"bandwidth usage percentage offset (%)")+"bandwidth being used by mobile station UE concerned", "set VP/VC bandwidth"×"bandwidth tolerance rate lower limit (%)"×"ATM/RLC-PDU rate conversion coefficient"}

Here, the "bandwidth usage percentage offset (%)" is a predetermined offset value (%), and the "bandwidth tolerance rate lower limit (%)" is a predetermined lower limit (%).

In addition, the "ATM/RLC-PDU rate conversion coefficient" is a coefficient calculated based on a ratio of the length of a header in an ATM cell to the length of a header in RLC-PDU. Specifically, the "ATM/RLC-PDU rate conversion coefficient" is a coefficient indicating an efficiency of conversion from an ATM cell to RLC-PDU.

When an IP transmission path is employed as the wired transmission path, on the other hand, the periodical MAX Iub rate calculator 24 is configured to calculate the "periodical MAX Iub rate" based on the following factors and notify the CA rate determiner 25 of the calculated "periodical MAX Iub rate". Specifically, as shown in FIG. 5, the "periodical MAX Iub rate" is calculated based on a bandwidth set for the IP transmission path (a predetermined bandwidth, a set IP transmission path bandwidth), on a bandwidth of the wired transmission path not being used (unused bandwidth), and on a bandwidth of the wired transmission path being used by the mobile station UE.

For example, the periodical MAX Iub rate calculator 24 is configured to calculate the "periodical MAX Iub rate" by using the following equation, in this case.

> MAX {"set IF transmission path bandwidth"×"IP/RLC-PDU rate conversion coefficient"×(100−"bandwidth usage percentage (%)"−"bandwidth usage percentage offset (%)")+"bandwidth being used by mobile station UE", "set IP transmission path bandwidth"×"bandwidth tolerance rate lower limit (%)"×"IP/RLC-PDU rate conversion coefficient"}

Here, the "IP/RLC-PDU rate conversion coefficient" is a coefficient calculated based on a ratio of the length of a header in an IP packet to the length of a header in RLC-PDU. Specifically, the "IP/RLC-PDU rate conversion coefficient" is a coefficient indicating an efficiency of conversion from an IP packet to RLC-PDU.

The CA rate determiner 25 is configured to determine a transfer rate (CA rate) of data transferred from the radio network controller RNC to the radio base station BTS, based on the predetermined bandwidth of the wired transmission path (the set VP/VC bandwidth or the set IP transmission path bandwidth), on a bandwidth of the wired transmission path not being used (unused bandwidth), and on a bandwidth of the wired transmission path being used by the mobile station UE, and notify the CA rate notifier 26 of the determined transfer rate.

The CA rate determiner 25 may be configured to determine the transfer rate (CA rate) based further on at least one of the communication quality in the radio transmission path, the data discard state in the wired transmission path, and the capability of the mobile station UE and a contract type of the mobile station UE.

Furthermore, the rate determiner 25 may be configured to determine the transfer rate (CA rate) in consideration of the ratio of the length of a header in an ATM cell to the length of a header in RLC-PDU, or of the ratio of the length of a header in an IP packet to the length of a header in RLC-PDU.

Specifically, the CA rate determiner 25 is configured to determine the CA rate at the predetermined period, based on the "MAX FP rate" notified of by the MAX FP rate receiver 21, the "Uu rate" (or the result of multiplication of the "Uu rate" and the "Uu transmission tolerance coefficient") notified of by the Uu rate calculator 22, the "Ui rate" notified of by the Ui rate calculator 23, and the "periodical MAX Iub rate" notified of by the periodical MAX Iub rate calculator 24.

For example, the CA rate determiner 25 may alternatively be configured to take a smallest value among the four values, the "MAX FP rate" notified of by the MAX FP rate receiver 21, the "Uu rate" (or the result of multiplication of the "Uu rate" and the "Uu transmission tolerance coefficient") notified of by the Uu rate calculator 22, the "Ui rate" notified of by the Ui rate calculator 23, and the "periodical MAX Iub rate" notified of by the periodical MAX Iub rate calculator 24, and set the smallest value as the CA rate at the predetermined period.

The CA rate notifier 26 is configured to notify the radio network controller RNC of the transfer rate (CA rate) determined by the CA rate determiner 25, by means of an NBAP message or the like.

(Operations of Mobile Communication System According to First Embodiment of Present Invention)

Figure 6:
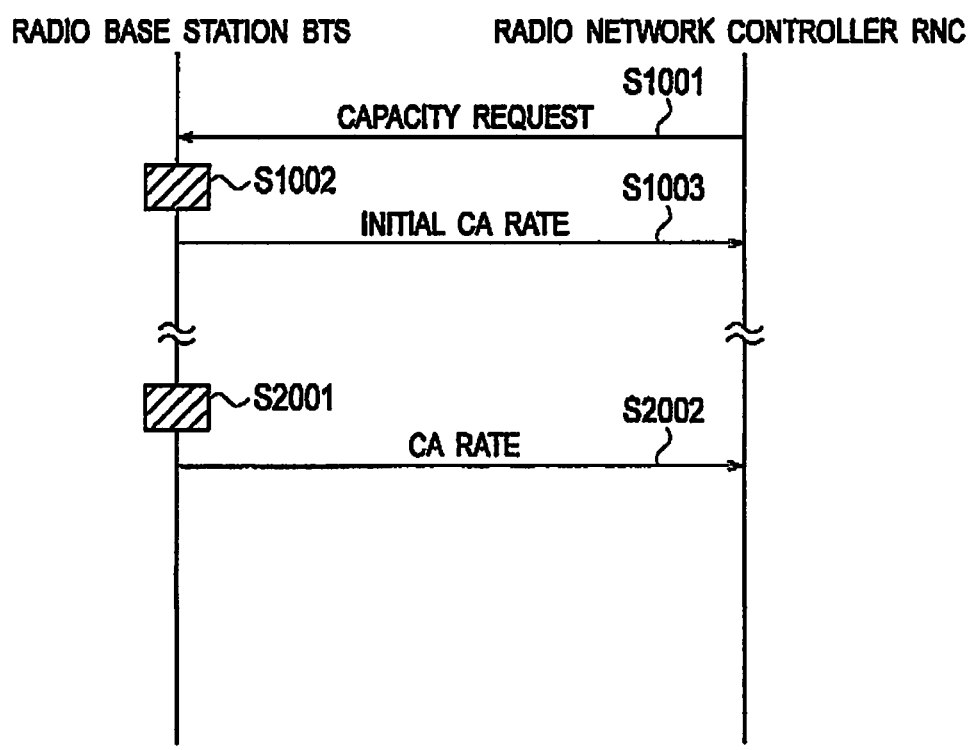
FIG. 6 is a sequence diagram showing operations of the mobile communication system according to the first embodiment of the present invention.

With reference to FIG. 6, a description will be given of the operations of the mobile communication system according to the first embodiment of the present invention.

As shown in FIG. 6, in Step S1001, the radio network controller RNC transmits a "Capacity Request" message to the radio base station BTS. Here, with the "Capacity Request" message, the radio network controller RNC instructs the radio base station BTS of notification of a transfer rate (CA rate) at which the radio network controller RNC transfers data to the radio base station BTS through a wired transmission path.

In Step S1002, in response to the received "Capacity Request" message, the radio base station BTS calculates an initial value of the transfer rate (CA rate) of data directed to a certain mobile station UE (initial CA rate).

In Step S1003, the radio base station BTS transmits the initial value of the calculated transfer rate (CA rate) of data directed to the mobile station UE (initial CA rate) to the radio network controller RNC.

Then, the radio base station BTS calculates a transfer rate (CA rate) of data directed to the mobile station UE at a predetermined period, namely, in Step S2001, and transmits the calculated transfer rate (CA rate) of data directed to the mobile station UE to the radio network controller RNC in Step S2002.

(Advantageous Effects of Mobile Communication System According to First Embodiment of Present Invention)

According to the mobile communication system according to the first embodiment of the present invention, the "periodical MAX Iub rate" is calculated in consideration of a bandwidth being used by a mobile station UE concerned, and is used to calculate the CA rate of data directed to that mobile station UE. As a result, the transfer rate (CA rate) at which the radio network controller RNC transfers data directed to the mobile station UE to the radio base station BTS is not lowered when there is space in, for example, the radio transmission path established between the radio base station BTS and the certain mobile station UE, or the buffer for the certain mobile station UE in the radio base station BTS (a buffer in the MAC-hs layer).

Note that the above-described operations of the mobile station UE, the radio base station BTS, and the radio network controller RNC may be implemented by hardware, by a software module executed by a processor, or by a combination of both.

The software module may be provided in a storage medium of any form including a random access memory (RAM), a flash memory, a read-only memory (ROM), an erasable programmable ROM (EPROM), an electronically erasable programmable ROM (EEPROM), a register, a hard disk, a removable disk, and a CD-ROM.

The storage medium is connected to the processor so that the processor can read and write information from and onto the storage medium. The storage medium may be integrated with the processor. In addition, the storage medium and the processor may be provided in an ASIC. The ASIC may be provided in the mobile station UE, the radio base station BTS, and the radio network controller RNC. Further, the storage medium and the processor may be in the mobile station UE, the radio base station BTS, and the radio network controller RNC as a discrete component.

The present invention has been described above in detail by using the above embodiment. However, it is apparent for those skilled in the art that the present invention is not limited by the embodiment described in this specification. The present invention can be implemented as amended or modified forms without departing from the spirit and scope of the present invention, which is defined by the description in "What is claimed is." The description of this specification has been given to illustrate the present invention, and therefore is not intended to limit the present invention.

What is claimed is:

1. A radio base station configured to receive data transferred from a radio network controller through a wired transmission path having a predetermined bandwidth, and to transmit the data to a mobile station through a radio transmission path, the radio base station comprising:
   a determiner configured to determine a transfer rate at which the radio network controller transfers the data to the radio base station, based on the predetermined bandwidth, on a bandwidth of the wired transmission path not being used, and on a bandwidth of the wired transmission path being used by the mobile station; and
   a notifier configured to notify the radio network controller of the determined transfer rate; wherein
   the wired transmission path is configured with a VP or VC in ATM, and
   the determiner determines the transfer rate in further consideration of a ratio of a length of a header in an ATM cell to a length of a header in an RLC-PDU associated with the ATM cell.

2. A radio base station configured to receive data transferred from a radio network controller through a wired transmission path having a predetermined bandwidth, and to transmit the data to a mobile station through a radio transmission path, the radio base station comprising:
   a determiner configured to determine a transfer rate at which the radio network controller transfers the data to the radio base station, based on the predetermined bandwidth, on a bandwidth of the wired transmission path not being used, and on a bandwidth of the wired transmission path being used by the mobile station; and
   a notifier configured to notify the radio network controller of the determined transfer rate; wherein
   the wired transmission path is configured with an IP transmission path, and
   the determiner determines the transfer rate in further consideration of a ratio of a length of a header in an IP packet to a length of a header in an RLC-PDU associated with the IP packet.

3. A mobile communication method by which a radio base station receives data transferred from a radio network controller though a wired transmission path having a predetermined bandwidth, and transmits the data to a mobile station through a radio transmission path, the method comprising the steps of:
   determining, at the radio base station, a transfer rate at which the radio network controller transfers the data to the radio base station, based on the predetermined bandwidth, on a bandwidth of the wired transmission path not being used, and on a bandwidth of the wired transmission path being used by the mobile station;
   notifying the determined transfer rate from the radio base station to the radio network controller; and
   transferring data from the radio network controller to the radio base station through the wired transmission path at a notified transfer rate, wherein
   the wired transmission path is configured with a VP or VC in ATM, and
   the determiner determines the transfer rate in further consideration of a ratio of a length of a header in an ATM cell to a length of a header in RLC-PDU.

4. A mobile communication method by which a radio base station receives data transferred from a radio network controller though a wired transmission path having a predetermined bandwidth, and transmits the data to a mobile station through a radio transmission path, the method comprising the steps of:
   determining, at the radio base station, a transfer rate at which the radio network controller transfers the data to the radio base station, based on the predetermined bandwidth, on a bandwidth of the wired transmission path not being used, and on a bandwidth of the wired transmission path being used by the mobile station;
   notifying the determined transfer rate from the radio base station to the radio network controller and
   transferring data from the radio network controller to the radio base station through the wired transmission path at a notified transfer rate, wherein
   the wired transmission path is configured with an IP transmission path, and
   the determiner determines the transfer rate in further consideration of a ratio of a length of a header in an IP packet cell to a length of a header in RLC-PDU.

* * * * *